(12) United States Patent
Laurent

(10) Patent No.: US 7,182,404 B2
(45) Date of Patent: Feb. 27, 2007

(54) SEAT WHICH CAN BE CONVERTED INTO A COUCHETTE WITH A DEFORMABLE ARMREST

(75) Inventor: Ligonniere Laurent, Poncet la Ville (FR)

(73) Assignee: Societe Industrielle et Commerciale de Materiel Aeronautique, Issoudun (FR)

( * ) Notice: Subject to any disclaimer, the term of this patent is extended or adjusted under 35 U.S.C. 154(b) by 208 days.

(21) Appl. No.: 10/448,467

(22) Filed: May 30, 2003

(65) Prior Publication Data
US 2004/0004383 A1 Jan. 8, 2004

(30) Foreign Application Priority Data
May 31, 2002 (FR) .................................. 02 06739

(51) Int. Cl.
*B60N 2/46* (2006.01)
*B60N 2/00* (2006.01)
*A47B 83/02* (2006.01)

(52) U.S. Cl. ........................... 297/411.39; 297/354.13; 297/173

(58) Field of Classification Search ........... 297/354.13, 297/342, 68, 80, 81, 84, DIG. 4, 423.34, 297/423.2, 343, 78, 411.39, 162, 173; 5/613, 5/600, 81.1 R, 618, 616, 617, 37.1, 41
See application file for complete search history.

(56) References Cited

U.S. PATENT DOCUMENTS 2,587,068 A * 2/1952 Sanders ........................ 5/86.1
2,694,814 A * 11/1954 Doner ............................. 5/47
3,053,568 A * 9/1962 Miller ......................... 297/78
4,046,418 A * 9/1977 Smith et al. ................. 297/118
4,119,342 A * 10/1978 Jones ............................ 297/80
5,040,253 A    8/1991 Cheng
5,790,997 A * 8/1998 Ruehl ........................... 5/618
5,890,765 A * 4/1999 LaPointe et al. ........ 297/354.13
6,109,685 A * 8/2000 Lindsey et al. ............... 297/40
6,154,899 A * 12/2000 Brooke et al. ............. 5/81.1 R
6,494,536 B2 * 12/2002 Plant ..................... 297/284.11

FOREIGN PATENT DOCUMENTS

| DE | 1 086 130 | 7/1960 |
| EP | 0 982 226 A2 | 3/2000 |
| FR | 2 707 569 | 1/1995 |
| JP | 58-427 | 1/1983 |

* cited by examiner

Primary Examiner—Milton Nelson, Jr.
(74) Attorney, Agent, or Firm—Blank Rome LLP

(57) ABSTRACT

A seat which can be converted into a couchette with a deformable armrest, comprising a squab structure (1) and a backrest structure (2) mounted so as to pivot with respect to the squab structure (1) between a raised position and an elongated position, and a deformable structure (3) comprising an upright (4) and a support member (5), the upright (4) being pivotally connected at one of its ends to the front part (1a) of the squab structure (1) and at its other end to the front part (5b) of the support member (5) so that the deformable structure (3) forms an armrest when the backrest structure (2) is in the raised position and so that the upright (4) and the support member (5) come into the line with each other at the level of the squab structure (1) and backrest structure (2) when the latter is in the elongated position.

18 Claims, 7 Drawing Sheets

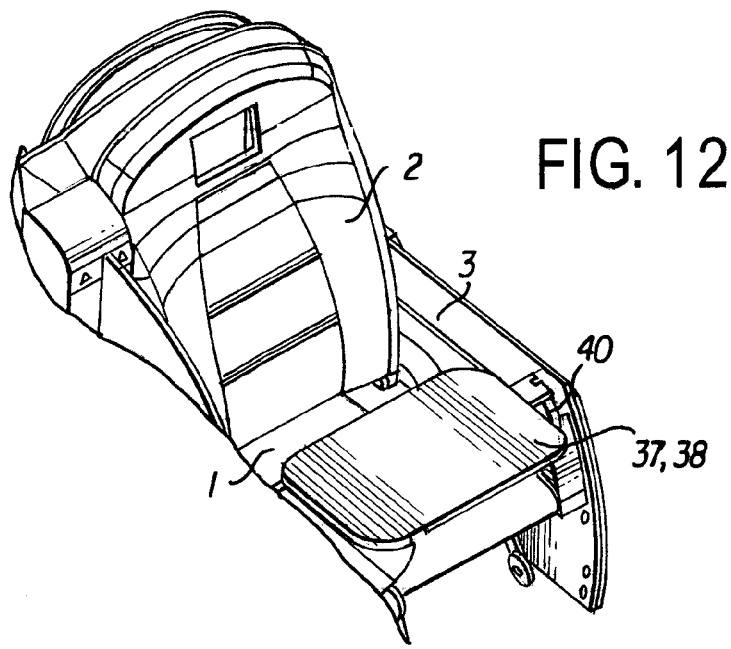
FIG. 12
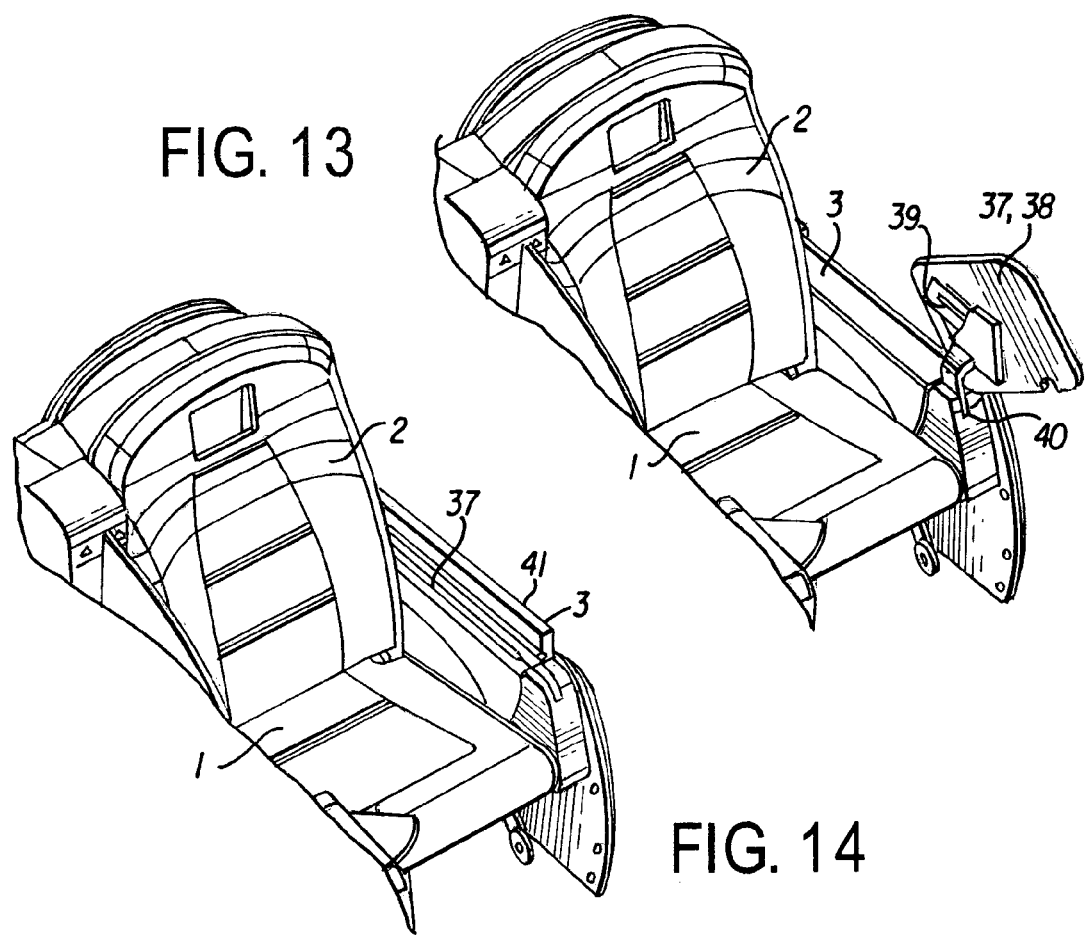
FIG. 13
FIG. 14

SEAT WHICH CAN BE CONVERTED INTO A COUCHETTE WITH A DEFORMABLE ARMREST

BACKGROUND OF THE INVENTION

The invention relates to a seat which can be converted into a couchette with a deformable armrest, and more particularly such a seat for a vehicle such as an aircraft comprising a squab structure and a backrest structure mounted so as to pivot with respect to the squab structure between a raised position and an elongated position, and a deformable armrest structure comprising a front upright and a support member, the upright being pivotally connected at one of its ends to the front part of the seat structure and at its other end to the front part of the support member so that the deformable structure forms an armrest when the backrest structure is in the raised position and so that the upright and the support member come into line with each other at the level of the squab structure and backrest structure when the latter is in the elongated position.

Such a seat is already known, for example through the document EP-A 0 982 226.

In this known seat, the rear part of the support member is articulated on the backrest structure.

When the backrest is in the raised position, the support member is in the high position held up by the upright at its front end and by the backrest at its rear end. The other end of the front upright is connected to the squab structure.

When the backrest is in the elongated position, the support member is in the low position and thus comes to locally widen the couchette formed by the squab and the backrest of the seat.

This arrangement assumes however that the support member, the upright, the squab structure and the backrest structure form a deformable parallelogram.

This has a number of drawbacks for the comfort of the occupant of the seat, in particular in the intermediate positions between the raised position and the elongated position.

SUMMARY AND OBJECTS OF THE INVENTION

The invention aims to overcome these drawbacks.

More particularly, the aim of the invention is to provide a seat which can be converted into a couchette, the armrest of which comes to widen the sleeping surface when the backrest is in the elongated position, but which affords maximum comfort for the occupant when the backrest is in the raised position or an intermediate position.

To that end, the object of the invention is a seat which can be converted into a couchette for a vehicle such as an aircraft, comprising a squab structure and a backrest structure mounted so as to pivot with respect to the squab structure between a raised position and an elongated position, and a deformable structure comprising an upright and a support member, the upright being pivotally connected at one of its ends to the front part of the squab structure and at its other end to the front part of the support member so that the deformable structure forms an armrest when the backrest structure is in the raised position and so that the upright and the support member come into line with each other at the level of the squab structure and backrest structure when the latter is in the elongated position, this seat comprising a link pivotally connected at one of its ends to the squab structure and at its other end to a slide, and a runner for receiving the slide mounted on the backrest structure, the rear part of the support member being pivotally connected to the slide.

Thus, when the backrest structure is in its generally vertical raised position, the slide on which the rear part of the support member is articulated is in the low part of the runner, closest to the squab structure.

When the backrest structure is progressively brought towards the elongated position, the link pivots downwards with respect to the squab structure whilst, simultaneously, the slide moves in the runner in the direction of the other end thereof.

When the backrest structure is in the elongated position, the slide is situated at the other end of the runner, furthest away from the squab structure.

Thus, the rear part of the support member is no longer connected rigidly to the backrest structure although the movements of the latter with respect to the squab structure control the deformations of the structure constituted by the upright and the support member.

It is no longer necessary for the support member, the upright, the squab structure and the backrest structure to constitute a deformable parallelogram.

It is thus possible to increase the length of the support member while limiting the total space requirement of the armrest.

Furthermore, the arrangement according to the invention makes it possible to limit the variation in height between the support member and the squab when the backrest is in a substantially vertical or slightly inclined position.

The runner/pivot connection between the support member and the backrest structure therefore makes it possible to improve the junction between the foam upholstery of the support member and that of the backrest structure.

In one particular embodiment, the runner extends generally parallel to the longitudinal direction of the backrest structure.

Longitudinal direction means the direction oriented from the part of the backrest structure closest to the squab structure towards its part furthest away where a headrest is generally situated.

Also in one particular embodiment, the runner is substantially rectilinear.

Also in one particular embodiment, the runner is mounted on the side of the backrest structure.

BRIEF DESCRIPTION OF THE DRAWINGS

A description will now be given by way of a non-limitative example of one particular embodiment of the invention with reference to the accompanying schematic drawings in which:

FIG. 12 depicts a perspective view of a seat, according to one embodiment, with a table integrated into the deformable structure, the table being in the position of use above the squab structure;

FIG. 13 depicts a perspective view of the seat, the table being in an intermediate position between the position of use and a storage position;

FIG. 14 depicts a perspective view of the seat, the table being in the storage position in the deformable structure.

DETAILED DESCRIPTION OF THE INVENTION

The seat which can be converted into a couchette comprises:

a squab structure 1;

a backrest structure 2;

a deformable structure 3.

Figure 1:
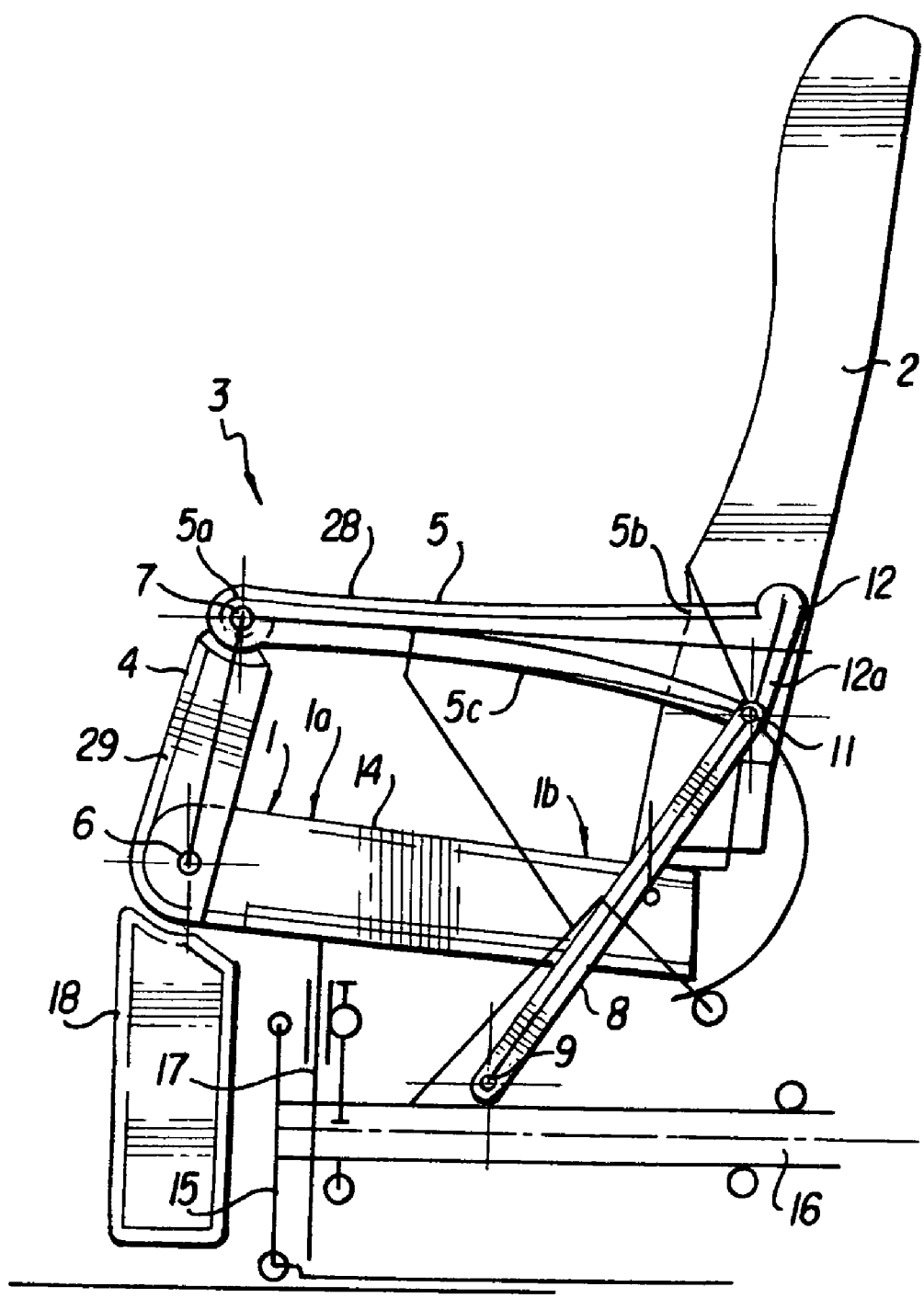
FIG. 1 depicts schematically from the side the convertible seat in the raised take-off position.
Figure 3:
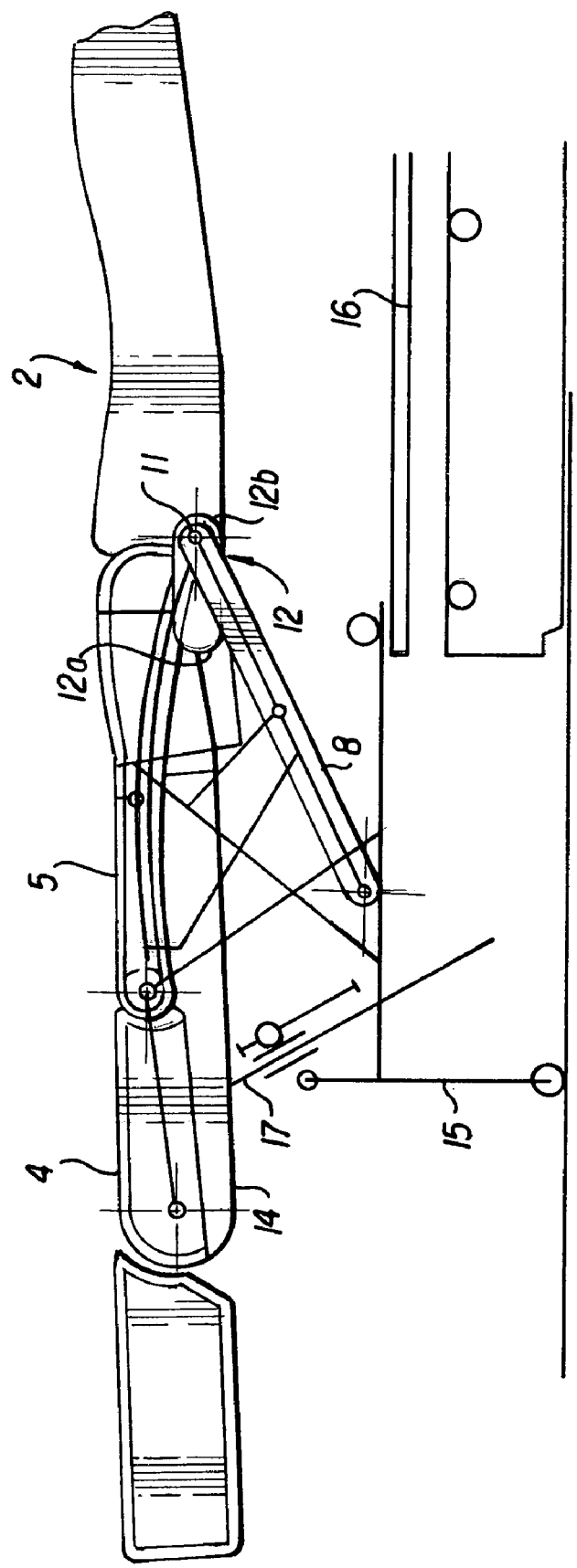
FIG. 3 depicts schematically from the side the seat of FIG. 1 in the elongated position.
Figure 4:
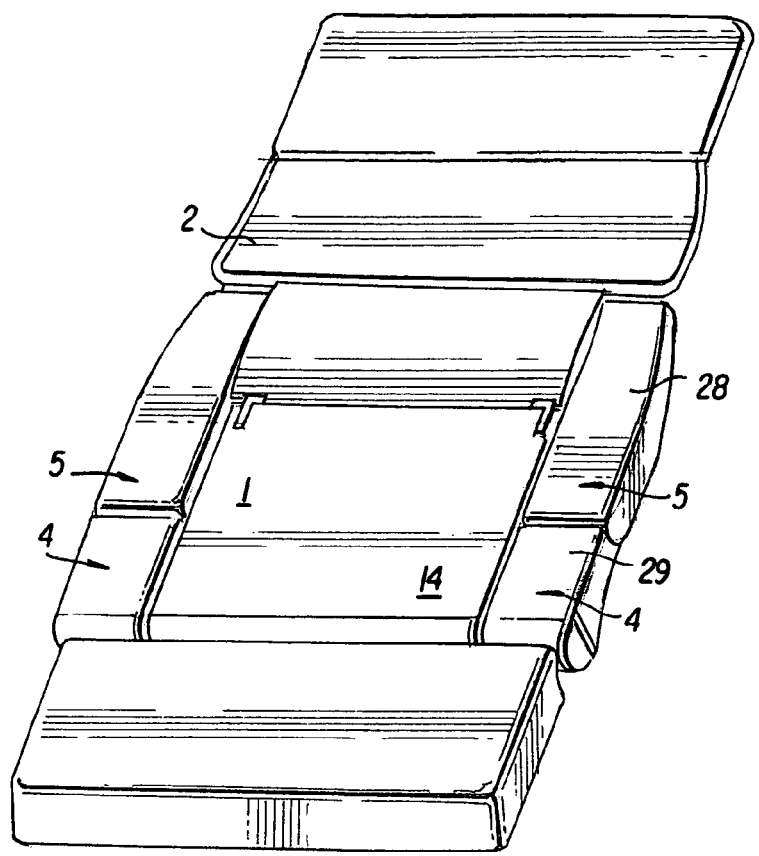
FIG. 4 is a perspective view of the seat in the elongated position.
Figure 5:
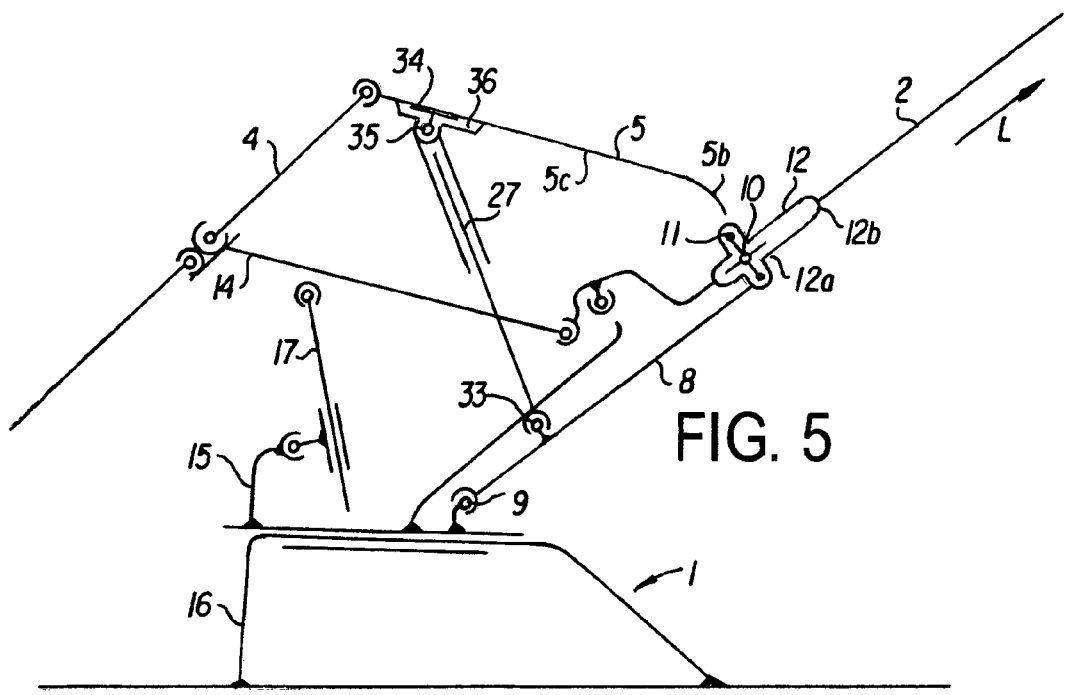
FIG. 5 is a schematic depiction of the seat in a slightly inclined position.

The backrest structure 2 is mounted so as to pivot with respect to the squab structure 1 between a raised take-off position depicted in FIGS. 1 and 5, and an elongated position where the seat forms a couchette depicted in FIGS. 3 and 4.

The deformable structure 3 comprises an upright 4 and a support member 5.

The front parts 1a, 5a respectively of the squab structure 1 and the support member 5 are defined as the parts opposite to the backrest structure 2. The rear parts 1b, 5b respectively of the squab structure 1 and the support member 5 are situated on the backrest structure 2 side.

In the embodiment depicted, the squab structure 1 comprises a squab 14 connected to a squab support 15.

The backrest structure 2 is pivotally mounted on the squab support 15.

The squab support 15 is mounted so as to be movable in translation on a fixed support 16.

This connection is for example implemented by a system of runners (not depicted) disposed respectively on the fixed support 16 and the squab support 15 in a substantially horizontal plane in a direction substantially perpendicular to the plane of the backrest structure 2 in the vertical position.

Figure 2:
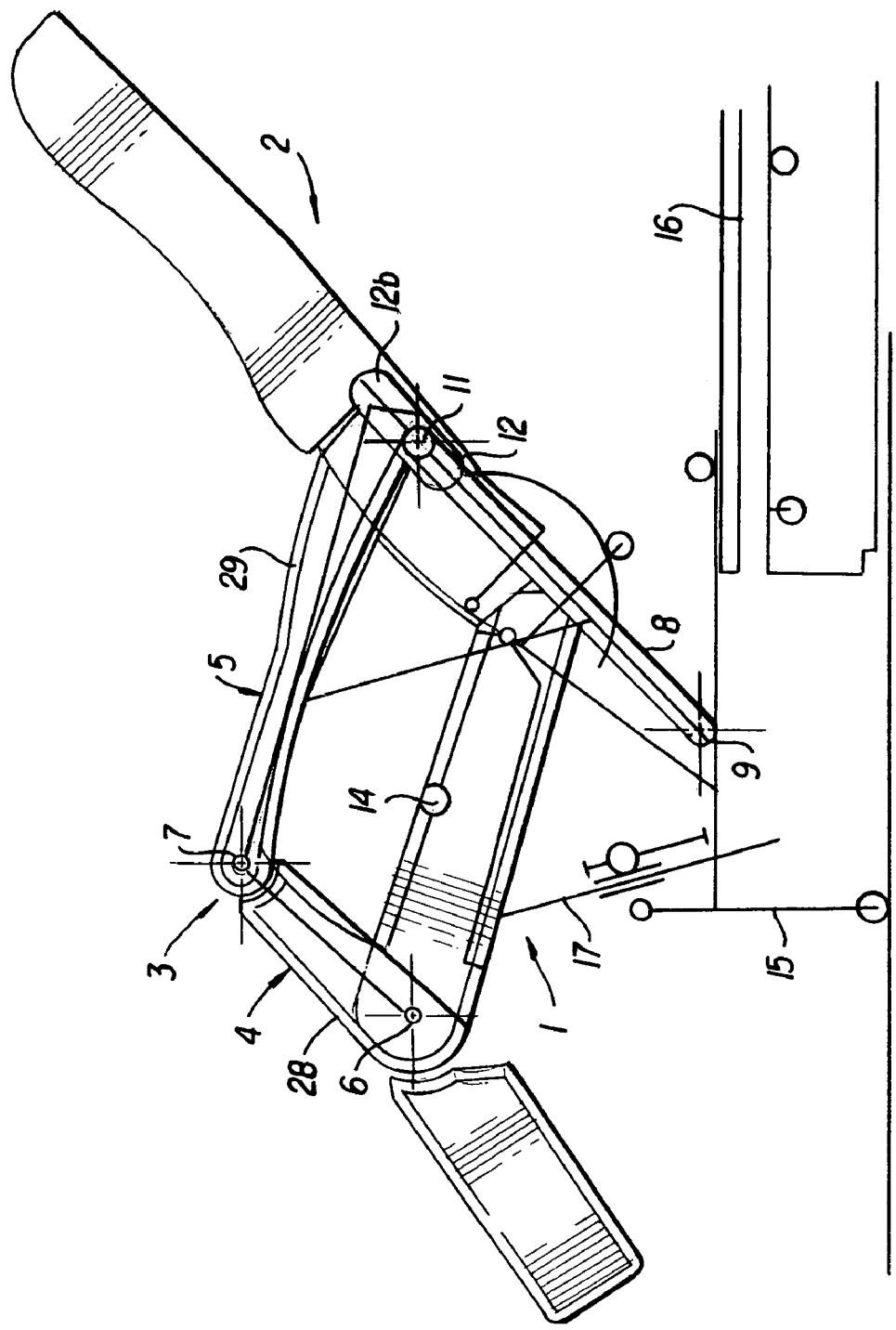
FIG. 2 depicts schematically from the side the seat of FIG. 1 in a slightly inclined comfort position.

The squab 14 can be inclined with respect to the squab support 15, in particular when the backrest is in an inclined position (FIG. 2).

This inclination is for example implemented by means of a cylinder 17 disposed between the squab support 15 and the front part of the squab 14.

A leg-rest 18 can be provided, pivotally mounted at the front end of the squab 14.

The structure of the deformable armrest 3 is now described in detail.

The upright 4 is connected at one of its ends to the front part 1a of the squab structure 1 by a pivot connection 6 and at its other end to the front part 5a of the support member 5 by a pivot connection 7.

The upright 4 thus forms a lower armrest and the support member 5 forms an upper armrest.

The seat furthermore comprises a link 8 connected at one of its ends to the squab structure 1 by a pivot connection 9 and at its other end to a slide 10 by a pivot connection 11.

The pivot connection 9 is situated in the bottom part of the squab structure 1, longitudinally towards the middle thereof, so that the link 8 is oriented generally, from the connection 9, upwards and towards the rear in the direction of the connection 11.

A runner 12 for receiving the slide 10 is provided. It is mounted on the backrest structure 2, the rear part 5b of the support member 5 being connected to the slide 10 by the pivot connection 11 (FIG. 5).

Thus, the deformable structure 3 forms an armrest when the backrest structure 2 is in the raised position (FIGS. 1, 5). The upright 4 and the support member 5 come into line with each other at the level of the squab structure 1 and backrest structure 2 when the latter is in the elongated position (FIGS. 3, 4), so that the width of the couchette is increased.

When the seat structure is in the raised position, the backrest 2 being almost vertical, the slide 10 on which the rear part 5b of the support member 5 is articulated is situated in the bottom part 12a of the runner, in the vicinity of the squab structure 1 (FIGS. 1, 5).

When the backrest structure 2 is progressively brought from the raised position towards the elongated position, the link 8 pivots downwards and towards the rear with respect to the squab structure 1 whilst, simultaneously, the slide 10 moves in the runner 12 in the direction of the other end 12b thereof (FIG. 2).

When the backrest structure 2 is in the elongated position, the slide 10 is situated at the other end 12b of the runner, at a distance from the squab structure 1 (FIG. 3).

In the embodiment depicted in the figures, the runner 12 extends parallel to the longitudinal direction L of the backrest structure 2.

The longitudinal direction L is symbolised by an arrow in FIG. 5.

In this embodiment, the runner 12 is substantially rectilinear and mounted on the side 13 of the backrest structure 2.

In the embodiment depicted in the figures, the upright 4 and the support member 5 comprise respectively flat support surfaces 28 and 29 which are substantially horizontal when the seat is in the elongated position. When the seat is in the elongated position, the surfaces 28 and 29 then come into line with the squab 14.

When the backrest is in the raised position, the flat support surface 29 is substantially horizontal.

Each surface 28, 29 is fixed to a substantially flat element 30a, 30b, for example in the form of a plate, extending in a direction substantially perpendicular to the plane of the surfaces 28, 29. These elements 30a, 30b are intended to support the covering of the deformable structure 3 (FIG. 6).

The elements 30a, 30b are disposed in substantially vertical planes, parallel and slightly offset with respect to each other, so that the element 30a fixed to the upright 4 is superimposed on the element 30b fixed to the support member 5 when the backrest structure 2 is in the raised position (FIG. 6), the element 30a fixed to the upright 4 being situated in line with the element 30b fixed to the support member 5 when the backrest structure 2 is in the elongated position. The elements 30a, 30b thus slide over one another in the manner of a fan.

The element 30b connected to the support member 5 is for example substantially rectangular in shape, the element 30a connected to the upright 4 being in the shape of a quarter disc, the radius of which is substantially identical to the height of the element 30b.

Figure 6:
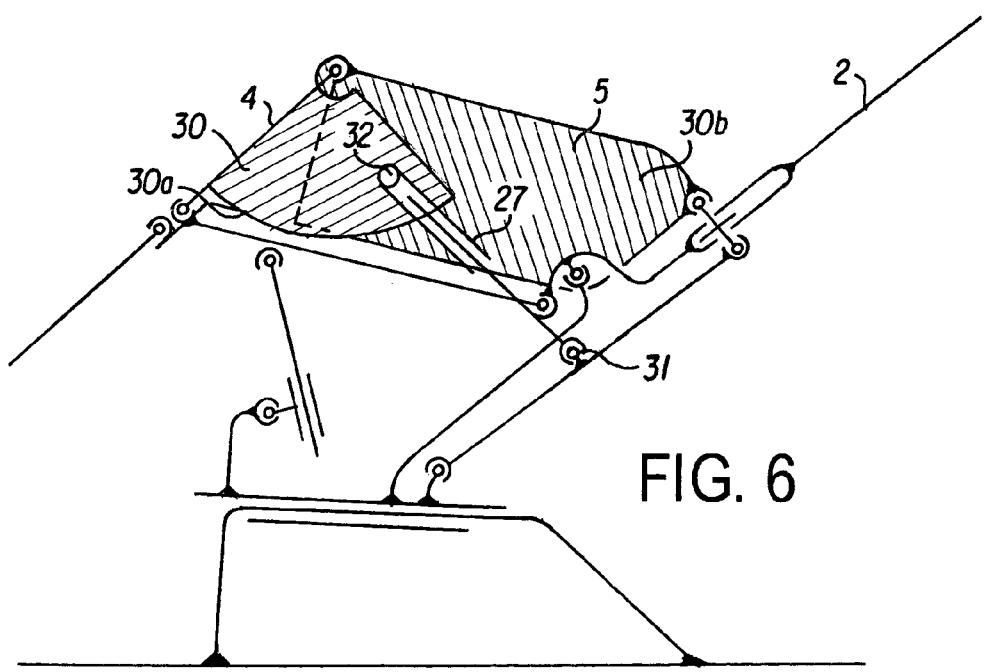
FIG. 6 is a schematic depiction of a variant of the seat in a slightly inclined position.

In the embodiment depicted in FIGS. 5 and 6, a cylinder 27 is provided, one end of which is connected to the link 8 by a pivot connection, and the other end of which is connected to the deformable structure 3. This cylinder 27 is intended to facilitate the movement of the backrest and/or of the support member 5 when the backrest goes from the elongated position to the raised position.

In the embodiment depicted in FIG. 6, the cylinder 27 is connected at one of its ends to the link 8 by a pivot connection 31 and to the upright 4 by a pivot connection 32.

The pivot connection 31 is situated substantially at the middle of the link 8. The pivot connection 32 is situated on the element 30a of the upright 4.

In the embodiment depicted in FIG. 5, the cylinder 27 is connected at one of its ends to the link 8 by a pivot connection 33 situated on the side opposite to the support member 5 and at its other end to a slide 34 by a pivot connection 35.

The pivot connection 33 is situated in the lower part of the link 8, in the vicinity of the pivot connection 9.

A runner 36 for receiving the slide 34 is provided. It is mounted on the support member 5 on the internal face 5c thereof, situated on the opposite side from the support surface 29. The runner 36 can be disposed in a housing provided for that purpose.

The substantially rectilinear runner 36 extends parallel to the longitudinal direction of the support member 5.

When the backrest structure 2 is in the raised position, the slide 34 is situated substantially at the middle of the runner 36.

When the backrest structure 2 is in the elongated position, the slide 34 is butting against the end of the runner 36 situated in the vicinity of the upright 4.

When the backrest structure 2 moves from the elongated position to the raised position, the slide 34 remains butting against the end of the runner 36 situated in the vicinity of the upright 4 so that, if the cylinder 27 is activated, it will help the raising of the support member 5.

Such a runner/pivot connection between the support member 5 and the cylinder 27 makes it possible to reduce the forces applied to the cylinder when the backrest structure 2 is in the raised position.

Thus, the arrangement according to the invention of the support member 5 and the upright 4 constitutes a deformable structure, which makes it possible to limit the variation in height between the support member and the squab when the backrest is in a substantially vertical or slightly inclined position compared with a parallelogram arrangement of the prior art.

When the backrest structure is moved from a position close to the inclined position to the elongated position, the height between the support member and the squab structure decreases quickly improving the comfort of the passenger owing to the arrangement of the invention.

Figure 7:
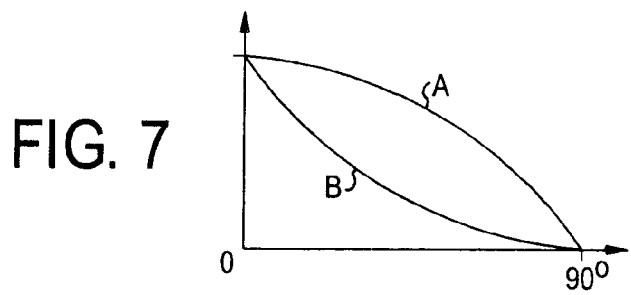
FIG. 7 depicts the variation in height H between the support member and the squab structure as a function of the inclination of the backrest structure.

This is illustrated by FIG. 7 which depicts the variation in height H between the support member 5 and the squab structure 1 as a function of the angle θ between a vertical plane and the backrest structure 2. The curve A in FIG. 7 corresponds to the invention, the curve B depicting the variation in height H between the support member and the squab of a parallelogram arrangement of the prior art.

Figure 10A:
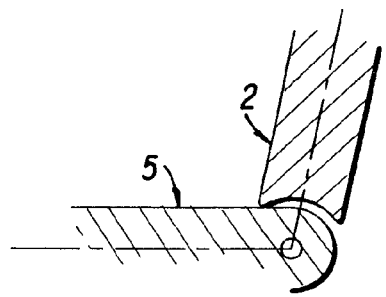
FIGS. 10a, 10b and 10c depict schematically the end of the support member and of the backrest structure of a seat having a parallelogram structure of the prior art.
Figure 10B:
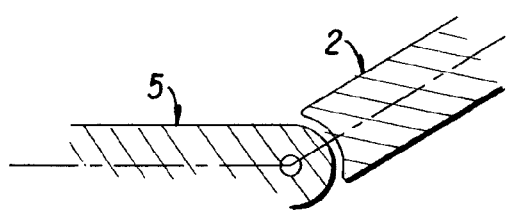
Figure 10C:
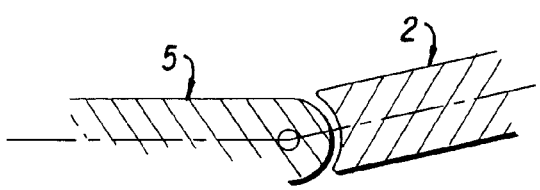

The pivot connection of the prior art between the support member and the backrest structure necessitates the implementation of rounded forms for the upholstery of the facing ends of the support member and backrest structure respectively, these ends being sufficiently far apart to avoid rubbing, thus forming a gap, as can be seen in FIGS. 10a to 10c.

Figure 11A:
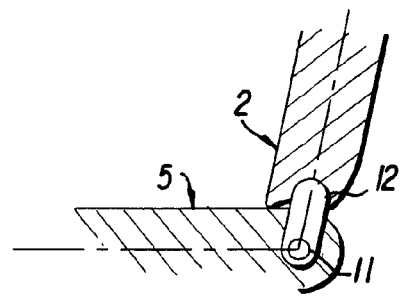
FIGS. 11a, 11b, 11c depict schematically the end of the support member and of the backrest structure of a seat according to the invention.
Figure 11B:
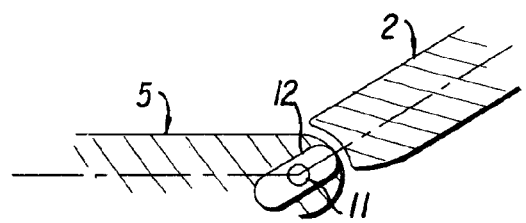
Figure 11C:
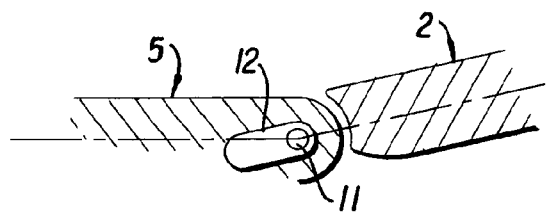

On the contrary, owing to the runner/pivot connection described in the invention, the upholstery of the facing ends can have flat faces which fit together perfectly when the backrest structure is in the elongated position; there is then no longer a gap between the end items of upholstery for better comfort of the passenger (FIGS. 11a to 11c).

Furthermore, it is not necessary for the backrest structure to be directly mounted so as to pivot on the squab structure. In particular, a connection can be provided between the backrest structure and the squab structure arranged so that the items of upholstery of the facing ends fit together perfectly irrespective of the position of the seat. This type of connection can, for example, be implemented by various actuators controlled by a control unit.

Figure 8:
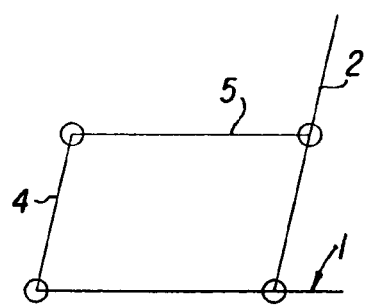
FIG. 8 depicts schematically an arrangement according to the prior art of the support member, the upright, the squab structure and the backrest structure constituting a deformable parallelogram.
Figure 9:
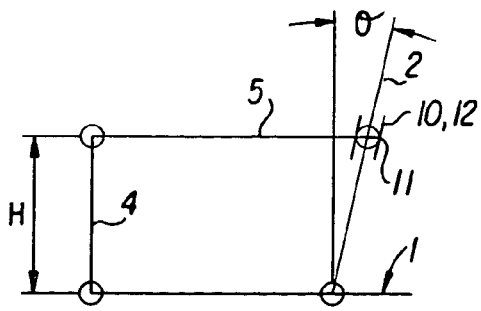
FIG. 9 depicts schematically an arrangement according to the invention of the support member, the upright, the squab structure and the backrest structure constituting a deformable structure.

Finally, it is possible to increase the length of the support member while limiting the total space requirement of the armrest. FIGS. 8 and 9 illustrate respectively a parallelogram arrangement of the prior art and an arrangement of the invention. For a support member according to the invention of greater length, the space requirement is substantially identical.

According to one embodiment, and with reference to FIGS. 12, 13, 14, the deformable structure 3 comprises a table 37.

The table 37 is movable between two positions: a position of use (FIG. 12) in which the table 37 is placed parallel to and above the squab structure 1; and a storage position (FIG. 14) in which the table 37 is placed in the plane of and inside the parallelogram formed by the deformable structure 3.

Between these two positions, the table 37 is placed in an intermediate position (FIG. 13) in which it is raised above the deformable structure 3.

The table 37 comprises a tray 38 in the shape of a rectangle with rounded corners, and the length of which is slightly less than the width of the squab structure 1. The tray 38 is fixed to a plate 39 comprising a projecting part mounted so as to pivot at a first end of an arm 40. The axis of pivot is coincident with that of the support member 5.

The arm 40 is partly situated in the top of the upright 4.

At its second end, it is mounted so as to pivot with respect to the upright 4. The axis of pivot is coincident with the axis of the pivot connection 7.

In the region of this pivot connection 7, means are provided making it possible to prevent the seat going into the elongated position as long as the table 37 is not in the storage position.

In this embodiment, as depicted in FIG. 14, the support member 5 is provided over its entire length with a pivoting part 41 along the edge external to the seat making it possible to expose an opening for passage of the table 37.

The table 37 can thus pivot about the axis of the pivot connection 7 between the storage position and the intermediate position.

When it is situated in the intermediate position, it only remains to make the tray 38 pivot about the arm 40 in order to place the table in the position of use.

The position of use of the table 37 does not allow the seat to go from its slightly inclined position to its elongated position. A system of contactors connected to the driving machinery of the seat locks the driving machinery of the seat.

The storing of the table 37 unlocks the driving machinery; it is then possible to put the seat into the elongated position and in the positions described previously.

A deformable armrest structure according to the invention can be disposed on each side of a seat or on a single side only, the other side of the seat then being provided with a fixed armrest for example.

The deformable armrest structure can be disposed in line with the backrest and the leg-rest, as depicted in FIG. 4, so that, in the couchette position, the seat has the same width over substantially its entire length.

In another embodiment, not depicted, the armrest structure is not in line with and protrudes from the lateral edge of the seat.

Control means are provided for controlling the various cylinders and actuators of the seat.

The invention claimed is:

1. A seat which can be converted into a couchette for a vehicle, comprising of:
    a squab structure and a backrest structure mounted so as to pivot with respect to the squab structure between a raised position and an elongated position;
    a deformable structure having an upright and a support member, the upright being pivotally connected at one of its ends to a front part of the squab structure and at its other end to a front part of the support member so that the deformable structure forms an armrest when the backrest structure is in the raised position and so that the upright and the support member come into line with each other at the level of the squab structure and backrest structure when the latter is in the elongated position;
    a link pivotally connected at one end to the squab structure and at another end to a slide; and
    a runner for receiving the slide mounted on the backrest structure, a rear part of the support member being pivotally connected to the slide.

2. A seat according to claim 1, wherein the runner extends generally parallel to a longitudinal direction of the backrest structure.

3. A seat according to claim 2, wherein the runner is substantially rectilinear.

4. A seat according to claim 2, wherein the runner is mounted on a side of the backrest structure.

5. A seat according to claim 1, wherein the squab structure comprises a squab connected to a squab support, and in that the end of the link is pivotally connected to the squab support of the squab structure.

6. A seat according to claim 5, wherein the squab support is fixed so as to be movable in translation on a fixed support, the backrest structure being pivotally connected to the squab support.

7. A seat according to claim 1, further comprising a cylinder, one end of which is connected to the link, and the other end of which is connected to the deformable structure.

8. A set according to claim 7, wherein one of the ends of the cylinder is connected to the link by a pivot connection situated substantially at the middle of the link, the other end of the cylinder being connected to the upright by a pivot connection.

9. A seat according to claim 7, wherein one of the ends of the cylinder is connected to the link by a pivot connection situated in the part of the link opposite to the support member, the other end of the cylinder being connected to a slide by a pivot connection, a runner for receiving the slide being mounted on the support member.

10. A seat according to claim 1, wherein the upright and the support member comprise respectively flat support surfaces and which are substantially horizontal when the seat is in the elongated position, each support surface being fixed to a substantially flat element extending in a direction substantially perpendicular to the plane of the support surfaces, the element fixed to the upright being superimposed on the element fixed to the support member when the backrest structure is in the raised position, the element fixed to the upright being situated in line with the element fixed to the support member when the backrest structure is in the elongated position.

11. A seat according to claim 10, further comprising a table movable between a position of use in which the table is situated parallel to and above the squab structure and a storage position in which the table is situated inside a parallelogram formed by the deformable structure.

12. A seat according to claim 1, further comprising a table movable between a position of use in which the table is situated inside a parallelogram formed by the deformable structure.

13. A seat according to claim 12, wherein the table is provided with means of locking the seat so that the seat can go into the elongated position only if the table is in the storage position.

14. A seat according to claim 12, wherein the table is movable on an axis of pivot coincident with the axis of the pivot connection between the upright and the support member and on an axis of pivot perpendicular to the preceding one and parallel to the support member.

15. A seat according to claim 14, wherein the table is provided with means of locking the seat so that the seat can go into the elongated position only if the table is in the position.

16. A seat according to claim 1, wherein the runner is substantially rectilinear.

17. A seat according to claim 16, wherein the runner is mounted on a side of the backrest structure.

18. A seat according to claim 1, wherein the runner is mounted on a side of the backrest structure.

* * * * *